United States Patent
Rao et al.

(10) Patent No.: US 10,462,012 B1
(45) Date of Patent: Oct. 29, 2019

(54) SEAMLESS DATA MIGRATION TO THE CLOUD

(71) Applicant: EMC IP Holding Company LLC, Hopkinton, MA (US)

(72) Inventors: Vinay Rao, Bangalore (IN); Xiali He, Upton, MA (US); Subin George, Framingham, MA (US); Arieh Don, Newton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 344 days.

(21) Appl. No.: 15/282,066

(22) Filed: Sep. 30, 2016

(51) Int. Cl.
  *G06F 15/173* (2006.01)
  *H04L 12/24* (2006.01)
  *G06F 3/06* (2006.01)
  *G06F 16/21* (2019.01)
  *H04L 29/08* (2006.01)

(52) U.S. Cl.
  CPC ............ *H04L 41/12* (2013.01); *G06F 3/0604* (2013.01); *G06F 3/067* (2013.01); *G06F 3/0655* (2013.01); *G06F 16/214* (2019.01); *H04L 67/1097* (2013.01)

(58) Field of Classification Search
  None
  See application file for complete search history.

(56) References Cited

U.S. PATENT DOCUMENTS

| 8,812,454 | B2 * | 8/2014 | Puttaswamy Naga ..................... G06F 12/123 707/661 |
| 8,861,525 | B1 * | 10/2014 | Durand ................. H04L 61/251 370/392 |
| 2015/0347047 | A1 * | 12/2015 | Masputra .............. G06F 3/0605 711/114 |
| 2015/0355855 | A1 * | 12/2015 | Cronin .................. G06F 3/0619 711/162 |

\* cited by examiner

*Primary Examiner* — Mohamed Ibrahim
(74) *Attorney, Agent, or Firm* — Anderson Gorecki LLP

(57) ABSTRACT

A data storage system migrates a device between a storage array and a cloud gateway based on monitored conditions such as access frequency. More particularly, both a logical volume and the associated data are migrated. The unique device ID (e.g. and without limitation the WWN or WWID) is maintained after migration so the migration is transparent to the host application. The device is deleted from the migration source after being moved to the migration target, thereby releasing resources such as memory, storage, processor cycles and bandwidth at the migration source. A multi-path IO driver in the host computer coordinates with a tiering program in the storage array and a monitoring program in the cloud gateway to manage migration of the logical volume.

20 Claims, 5 Drawing Sheets

SEAMLESS DATA MIGRATION TO THE CLOUD

BACKGROUND

The subject matter of this disclosure is generally related to data storage systems that maintain large data sets for supporting multiple host applications and concurrent users. A data storage system may include one or more storage arrays. Each storage array may include a plurality of computing nodes that manage access to tangible data storage devices. More particularly, the computing nodes present one or more logical production volumes of storage that are backed by the tangible storage devices. A separate logical production volume may be created for each host application. The host applications access the data associated with the production volumes by sending IOs to the storage array.

It is sometimes desirable to move inactive data out of a storage array in order to make storage resources available for other data. For example it is known to archive infrequently accessed data on low cost, low performance media such as magnetic tape. However moving data to magnetic tape is a manual process so both the data archival and data retrieval processes are slow. A more recently developed technique is to configure the storage array to move infrequently accessed data to inexpensive remote cloud storage. Unlike with magnetic tapes, the storage array can automatically archive inactive data and retrieve archived data from cloud storage in response to IOs. However, storage array resources are still required to maintain the logical volume.

SUMMARY

All examples, aspects and features mentioned in this document can be combined in any technically possible way.

In accordance with an aspect an apparatus comprises: a host computer comprising a processor, computer-readable memory and at least one host application; a storage array comprising a plurality of computing nodes and persistent storage, each computing node comprising a processor and computer-readable memory, and managing a portion of the persistent storage; and a cloud gateway comprising a processor, computer-readable memory, and a translation program that translates between a first protocol implemented by the host computer and a second protocol implemented by cloud storage; and program code stored on a non-transitory computer-readable medium that migrates a logical volume and associated data between the storage array and the cloud gateway while maintaining a unique device ID that is associated with the logical volume, whereby the migration is transparent to the at least one host application. In some implementations a multi-path input-output driver on the host computer monitors accesses to the logical volume and prompts migration of the volume based on the monitored accesses. In some implementations the logical volume is presented by the storage array, and a tiering program on the storage array monitors accesses to the logical volume and prompts migration of the volume to the cloud gateway based on the monitored accesses. In some implementations the logical volume is presented by the cloud gateway, and a monitoring program on the cloud gateway monitors accesses to the logical volume that are used to prompt migration of the volume to the storage array. In some implementations the logical volume is presented by the storage array, and a multi-path input-output driver on the host computer instructs the cloud gateway to configure a device with the device ID. In some implementations the program code moves the associated data to the configured device on the cloud gateway. In some implementations the program code deletes the logical volume from the storage array. In some implementations there is a multi-path input-output driver on the host computer, and the program code updates the paths between the host computer and the logical volume. In some implementations the program code migrates the logical volume from the storage array to the cloud gateway based on an absence of accesses to the logical volume. In some implementations the program code migrates the logical volume from the cloud gateway to the storage array based on resumption of accesses to the logical volume.

In accordance with an aspect a method comprises: in a storage system comprising: a host computer comprising a processor, computer-readable memory and at least one host application; a storage array comprising a plurality of computing nodes and persistent storage, each computing node comprising a processor and computer-readable memory, and managing a portion of the persistent storage; and a cloud gateway comprising a processor, computer-readable memory, and a translation program that translates between a first protocol implemented by the host computer and a second protocol implemented by cloud storage: migrating a logical volume and associated data between the storage array and the cloud gateway; and maintaining a unique device ID that is associated with the logical volume, whereby the migration is transparent to the at least one host application. Some implementations comprise a multi-path input-output driver on the host computer monitoring accesses to the logical volume and prompting migration of the volume based on the monitored accesses. Some implementations wherein the logical volume is presented by the storage array comprise a tiering program on the storage array monitoring accesses to the logical volume and prompting migration of the volume to the cloud gateway based on the monitored accesses. Some implementations wherein the logical volume is presented by the cloud gateway comprise a monitoring program on the cloud gateway monitoring accesses to the logical volume that are used to prompt migration of the volume to the storage array. Some implementations wherein the logical volume is presented by the storage array comprise a multi-path input-output driver on the host computer instructing the cloud gateway to configure a device with the device ID. Some implementations comprise moving the associated data to the configured device on the cloud gateway. Some implementations comprise deleting the logical volume from the storage array. Some implementations comprise updating the paths between the host computer and the logical volume. Some implementations comprise migrating the logical volume from the storage array to the cloud gateway based on an absence of accesses to the logical volume. Some implementations comprise migrating the logical volume from the cloud gateway to the storage array based on resumption of accesses to the logical volume.

DETAILED DESCRIPTION

Some aspects, features and implementations described herein may include machines such as computer devices, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, multiple virtual computing devices could operate simultaneously on one physical computing device. The term "logic" is used to refer to special purpose physical circuit elements and software instructions that are stored on a non-transitory computer-readable medium and implemented by multi-purpose tangible processors.

Figure 1:
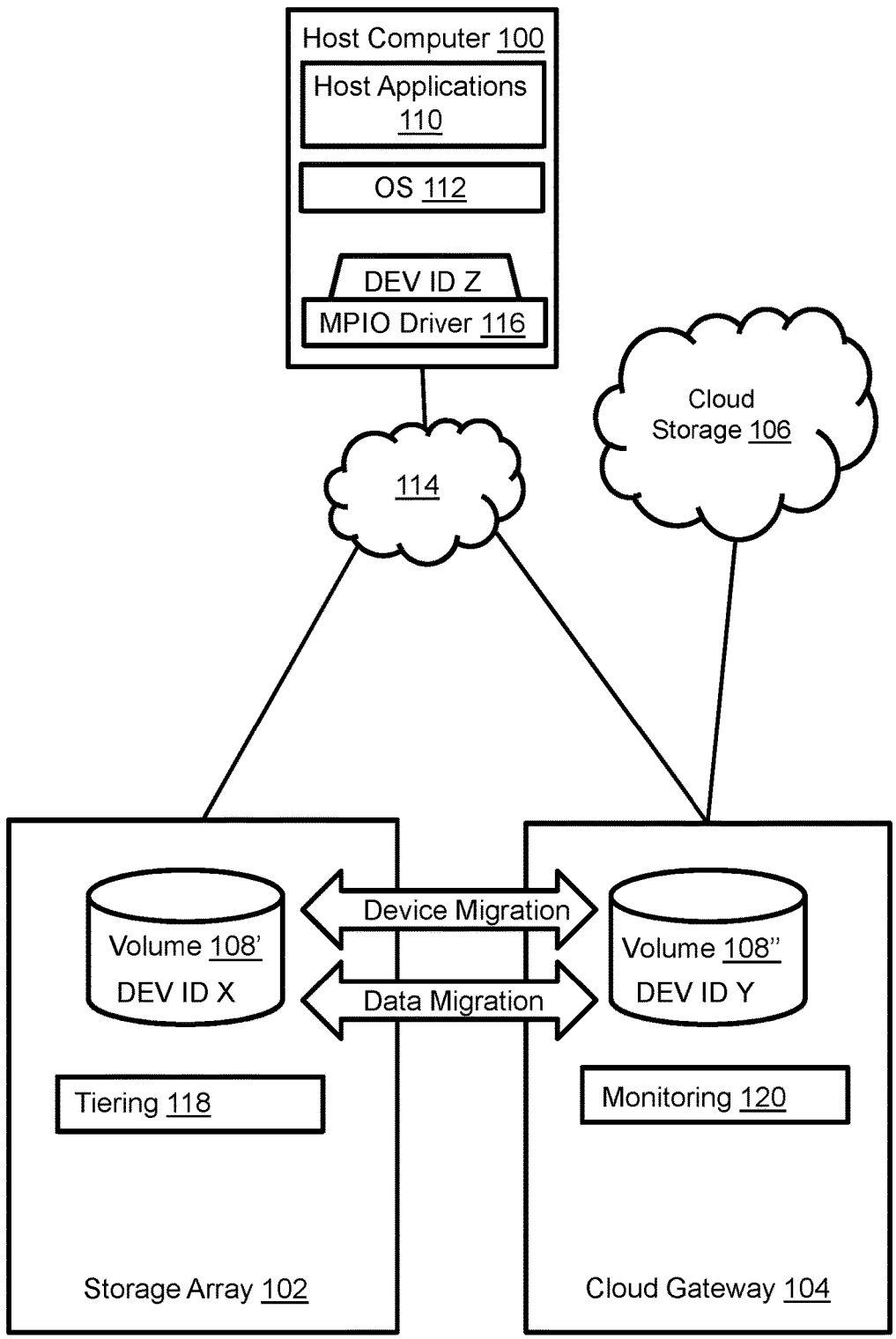
FIG. 1 illustrates an exemplary data storage system.

FIG. 1 illustrates an exemplary data storage system that includes a host computer 100, a storage array 102, a cloud gateway 104 and cloud storage 106. The cloud gateway and cloud storage may have performance characteristics such as IO response time that are sufficient to support live data, although the storage array exhibits higher performance than the cloud gateway and cloud storage. The data storage system migrates a logical production volume (volume 108' as presented by the storage array, volume 108" as presented by the cloud gateway, and volume 108 collectively) between the storage array 102 and the cloud gateway 104 based on monitored conditions such as access frequency. More particularly, both the logical volume and associated data are migrated. In the illustrated example the storage array 102 may present the logical volume 108' to the host computer 100 when the data is relatively active and maintained by the storage array, and the cloud gateway 104 may present the volume 108" to the host computer 100 when the data is less active or inactive and maintained by the cloud gateway and cloud storage 106. The logical volume is deleted from the migration source after being moved to the migration target, thereby releasing resources such as memory, storage, processor cycles and bandwidth at the migration source. The host computer 100 includes MPIO (multi-path input-output) drivers 116 that coordinate with a tiering program 118 in the storage array and a monitoring program 120 in the cloud gateway to manage migration of the logical volume in a manner that is transparent to host applications 110 and a host OS 112 (operating system). More particularly, the volume is presented to the OS 112 by MPIO drivers 116 with a unique device ID Z, e.g. and without limitation a WWN (World Wide Name) or WWID (World Wide Identifier), that is used both before and after migration of the volume.

Although the data storage system is illustrated with a single data storage array 102 and a single external host computer 100 utilizing a single logical production volume 108, any number of host computers, data storage arrays and logical production volumes could be included in the data storage system. The host computer 100 may be connected to the storage array 102 via a network 114. The network 114 may include various types of network nodes, e.g. switches, routers, hubs, and other network devices, and may include one or more of the Internet, a WAN (wide area network), MAN (metropolitan area network), LAN (local area network), and SAN (Storage Area Network). The host 100 uses storage services provided by the storage array 102 and cloud gateway 104 via the network 114. The cloud gateway may be connected to cloud storage via a network, and the cloud storage may include a public or private cloud.

Figure 2:
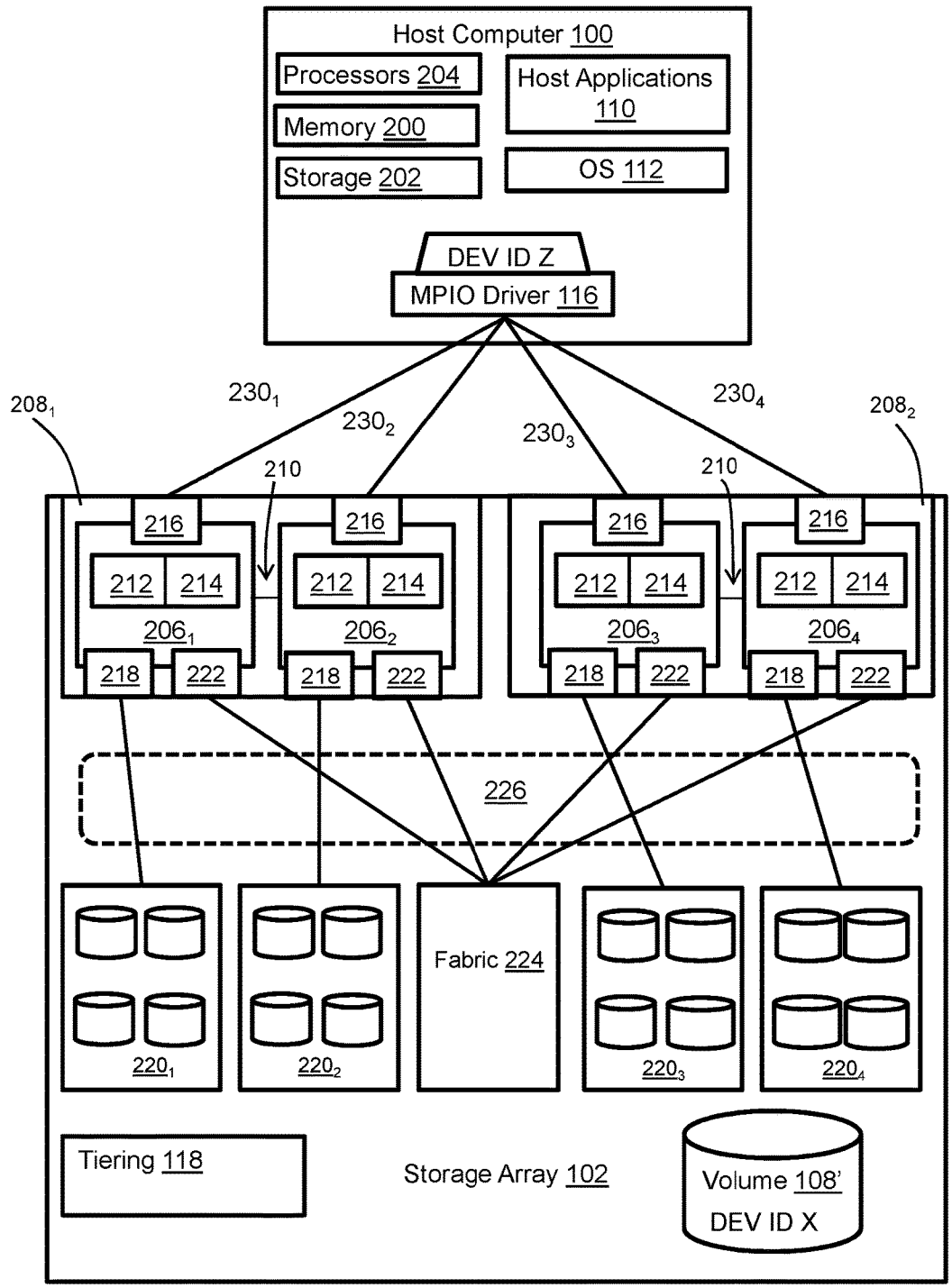
FIG. 2 illustrates the host and storage array in greater detail.

FIG. 2 illustrates the host computer 100 and storage array 102 in greater detail. The host computer 100 may be a server with volatile memory 200, persistent storage 202 and tangible processors 204. The host computer might include virtual hosts running on virtual machines or containers. Although an external host computer 100 is illustrated, internal hosts may be instantiated within the storage array 102. The host 100 operates host applications 110 that utilize storage services provided by the storage array 102 and cloud gateway 104 (FIG. 1). There may be any number of host applications 110 running on the host computer. Examples of host applications include but are not limited to a database, file server and block server.

The storage array 102 includes a plurality of computing nodes $206_1$-$206_4$. Pairs of computing nodes ($206_1$, $206_2$) and ($206_3$, $206_4$) may be organized as storage engines $208_1$, $208_2$, respectively. The paired computing nodes of a storage engine may be directly interconnected by communication links 210. Each computing node includes at least one tangible multi-core processor 212 and a local cache 214. The local cache may include, for example and without limitation, volatile memory components such as RAM (random access memory) and non-volatile memory components such as high performance SSDs (solid state devices). Each computing node may include one or more FEs 216 (front-end directors, aka front end adapters) for communicating with the host computer 100, cloud storage, other storage arrays and other devices that can be reached via the network. Each computing node may also include one or more BEs 218 (back end directors, aka back end adapters) for communicating with associated back end storage, i.e. managed drives $220_1$-$220_4$. Each set of managed drives may include tangible storage devices of one or more technology types, for example and without limitation SSDs such as flash, and HDDs (hard disk drives) such as SATA (Serial Advanced Technology Attachment) and FC (Fibre Channel). Each computing node may also include one or more CAs (channel directors, aka channel adapters) 222 for communicating with other computing nodes via interconnecting fabric 224. Each computing node may allocate a portion or partition of its respective local cache 214 to a virtual shared cache 226 that can be accessed by other computing nodes, e.g. via DMA (direct memory access) or RDMA (remote direct memory access).

The computing nodes $206_1$-$206_4$ of the storage array maintain the logical production volume 108' when the associated data is stored in the managed drives $220_1$-$220_4$. Without limitation, the logical volume 108' may be referred to as a device, production volume, production LUN or host LUN, where LUN (logical unit number) is a number used to identify the logical storage volume in accordance with the SCSI (small computer system interface) protocol. The logical volume 108' represents an abstraction layer between the managed drives $220_1$-$220_4$ and the host computer 100. From the perspective of the host applications 110 and the host OS 112 the logical volume 108' is a single data storage device having a set of contiguous fixed-size LBAs (logical block addresses) on which data used by the host applications 110 resides. However, the data used by the host applications may actually be maintained by the computing nodes at non-contiguous addresses on various different managed drives. The storage array maintains metadata indicative of the locations of extents of data on the managed drives. Consequently, the computing nodes can use the metadata to determine the actual location of data on the managed drives based on a reference to the production volume in an IO from the host computer 100.

The storage array temporarily places data for servicing IOs associated with the logical volume 108' in the shared cache 226. For example, if computing node $206_1$ is servicing an IO that contains a request to read data extent "1" from the logical volume 108 then metadata is used to find the location of extent 1 in the managed drives. Extent 1 is then copied from the managed drives to the shared cache 226, where it can be accessed by any of the computing nodes. For purposes of explanation it is assumed that a "cache miss" occurs, i.e. that extent 1 is not already present in the shared cache 226 when the IO is received. The computing node that is servicing the IO accesses the cached copy of extent 1 in order to return a copy of extent 1 to the host application in the case of a read request. The computing node may use a RDMA operation to access the copy of extent 1 in the shared cache if the data is in the local cache of a different computing node. In another example, if the IO contains a request to write extent 1 to logical volume 108' then the computing node copies extent 1 from the IO into the shared cache, e.g. using an RDMA operation. The computing node then uses the metadata to find the location of extent 1 (or a location for new extent 1) on the managed drives. The copy of extent 1 may reside in the shared cache for some period of time but is eventually destaged (moved) from the shared cache to the managed drives (aka back end storage). For purposes of explanation it is again assumed that a cache miss occurs, i.e. that extent 1 is not already present in the shared cache when IO is received. A cache hit occurs when extent 1 is already present in the shared cache when an associated IO is received. The shared cache and storage engines may differentiate the storage array from other storage devices such as the cloud gateway and storage servers.

The MPIO driver 116 is responsive to IOs from the host applications 110 and host operating system 112 to provide access to the logical volume 108'. There are multiple paths $230_1$-$230_4$ between the host 100 and the storage array, e.g. one FC path per FE 216. Each path may have a locally unique address that is known to the MPIO driver. However, the host OS and host applications are not aware of the paths and addresses, but rather view the logical volume as available via a single logical path. The MPIO driver is responsive to an IO request from the host applications or host OS to select one of the paths $230_1$-$230_4$ to send the IO to the storage array. Paths may be selected by the MPIO driver based on a wide variety of techniques and algorithms including, for context and without limitation, performance and load balancing. The shared cache 226 may enable the logical volume 108' to be reachable via all of the computing nodes and paths, although the storage array can be configured to limit use of certain paths to certain logical volumes. For example, the logical volume 108' may be configured to be accessible via only a subset of FAs 216.

The storage tiering program 118 may be implemented by the computing nodes to promote relatively active data (recently accessed) to higher performance storage media, e.g. to tier 0 SSD managed drives, and demote relatively inactive data (not recently accessed) to lower performance storage media, e.g. to tier 1 HDD managed drives. Promotion and demotion of extents of data between data devices and tiers may occur periodically or continuously as activity levels change. The tiering program monitors data access activity including frequency of access to individual extents and logical production volumes. In some implementations all of the managed drives are SSDs and the cloud gateway/cloud storage are used as a lower performance tier of storage.

Figure 3:
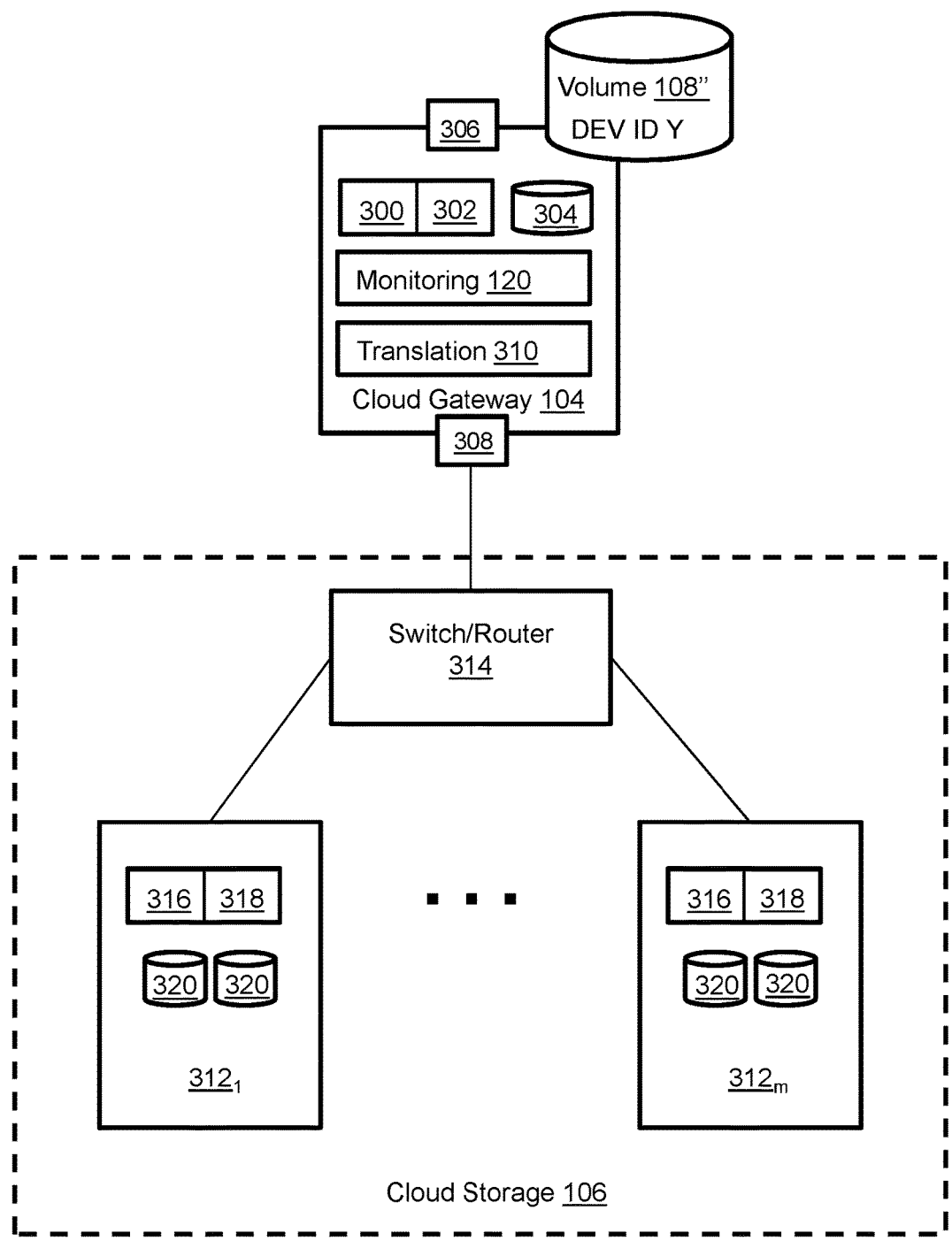
FIG. 3 illustrates the cloud gateway and cloud storage in greater detail.

FIG. 3 illustrates the cloud gateway 104 and cloud storage 106 in greater detail. The cloud gateway 104 may be a tangible server computer that includes a tangible processor 300, volatile memory 302, and persistent storage 304. A network interface 306 is used for communication with the host computer and the storage array. A cloud interface 308 is used for communication with cloud storage 106. A translation program 310 translates between the protocols and APIs implemented by the host computer and the storage array, e.g. without limitation SCSI, and the protocols and APIs implemented by cloud storage, e.g. without limitation SOAP, REST and proprietary Web-based APIs that are specific to the cloud storage service provider. The memory 302 and storage 304 components are used to buffer data that is being written to cloud storage 106. Monitoring program 120 presents the logical volume 108" to the host computer when the logical volume is maintained by the cloud gateway 104. The monitoring program also monitors data access activity including frequency of access to individual extents and devices. Relatively active data may be maintained in memory 302 and storage 304, while less active data may be moved to cloud storage 106. In order to retrieve data, e.g. in response to an IO from the host computer, the cloud gateway obtains the data from cloud storage and then provides the data to the host. Relatively inactive data may be destaged from the cloud gateway to cloud storage.

Cloud storage 106 includes a plurality of storage servers $312_1$-$312_m$ that are interconnected by a switch/router 314. Each storage server may include a processor 316, memory 318 and relatively low performance HDDs 320. Both cost and performance per unit of storage capacity may be low in comparison with the storage array. Although cloud storage does not provide performance that is equivalent to the performance of the storage array, e.g. in terms of response time for servicing IOs, the cloud gateway and cloud storage may have performance that is sufficient to support live data that is accessed relatively infrequently and data for host applications that do not require fast response time. For example, the cloud gateway may include a disk cache for caching data that is being sent to and from cloud storage.

Figure 4:
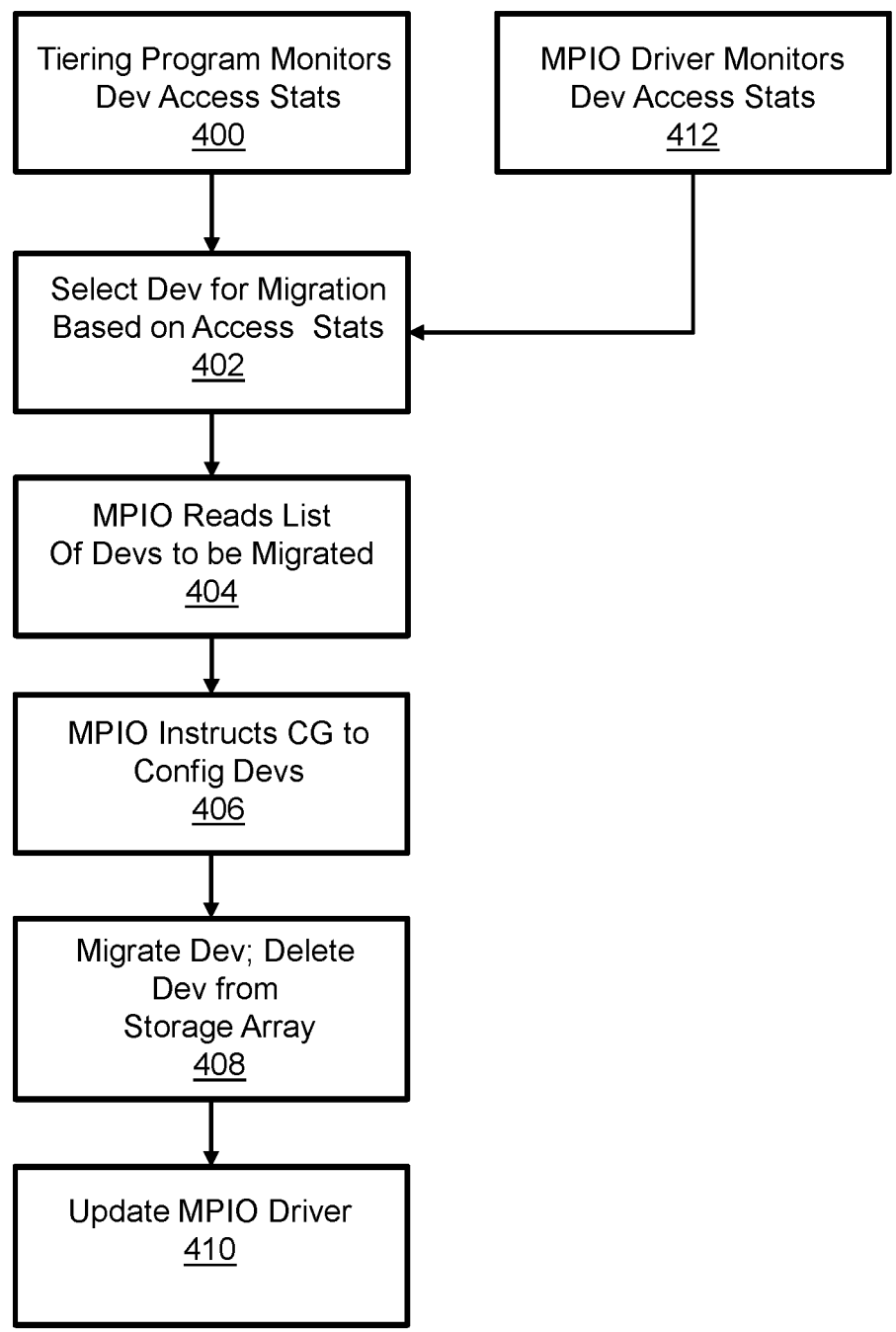
FIG. 4 illustrates a technique for migrating a device from a storage array to a cloud gateway.

Device and data migration from the storage array 102 to the cloud gateway 104 will now be described with reference to FIGS. 1 and 4. Tiering program 118 monitors device usage on the storage array as indicated at block 400. More particularly, the tiering program monitors accesses by the host to data associated with all logical volumes presented by the storage array, including logical volume 108', and the data access information is used to generate device access statistics that indicate relative levels of access activity between devices and quantified access activity relative to a predetermined threshold value. The tiering program may select one or more devices for migration based on the access statistics as indicated in block 402. For example, if the threshold value is a period of inactivity and none of the extents of data associated with logical volume 108' have been accessed during that time period then volume 108' may be selected for migration based on inactivity. The threshold could specify some threshold level of activity during the time period, i.e. the device need not necessarily be un-accessed during the time period in order to be selected for migration. With regard to relative levels of activity, if the storage array has reached a predetermined level of data storage capacity then the least active device may be selected for migration. The IDs of the devices selected for migration are stored in a record. The MPIO driver 116 reads the record of devices selected for migration as indicated in block 404. For example, the MPIO driver may send a SCSI mode sense command. The tiering program responds to the mode sense command with the record. The MPIO driver then instructs the cloud gateway to configure corresponding devices on the cloud gateway as indicated in block 406. For example, a cloud gateway device (logical volume 108") corresponding to the storage array device to be migrated (logical volume 108') is created. The MPIO driver runs a scan after the device has been created on the cloud gateway in order to discover the new LUN associated with the device on the cloud gateway. The device created on the cloud gateway may have the same size and addresses as the corresponding device on the storage array. However, the unique device ID X of the device (volume 108') on the storage array is different than the unique device ID Y of the device (volume 108") on the cloud gateway, e.g., the WWN or WWID. The LUN (i.e. the number) may also differ between the device on the storage array and the device configured on the cloud gateway. However, MPIO driver 116 consistently presents device ID Z to the OS 112, so the migration is transparent to the OS 112. The instruction sent by the MPIO driver to prompt creation of the device may include a SCSI VU command. The storage array device is then migrated as indicated in block 408. More particularly, the data is moved from the storage array 102 to the cloud gateway 104 and the device is deleted from the storage array, thereby releasing storage array resources that would be required to maintain the device. The data may be moved directly from the storage array to the cloud gateway or may be moved from the storage array to the cloud gateway via the host computer. Some or all of the data may be maintained in memory and storage in the cloud gateway, persistent storage in cloud storage, and combinations thereof. The MPIO driver 116 then updates its record of paths to the logical device as indicated by block 410, e.g. by removing references to paths to the storage array and maintaining references to paths to the cloud gateway. When IOs to the device are sent to the MPIO driver by the host applications and OS after migration the IOs are directed to the cloud gateway rather than the storage array.

As indicated by block 412 the MPIO driver may be used to monitor device access statistics and select devices for migration based on the statistics. In other words, monitoring of device access statistics by the MPIO driver may be implemented in conjunction with or as an alternative to monitoring of device access statistics by the tiering program.

Figure 5:
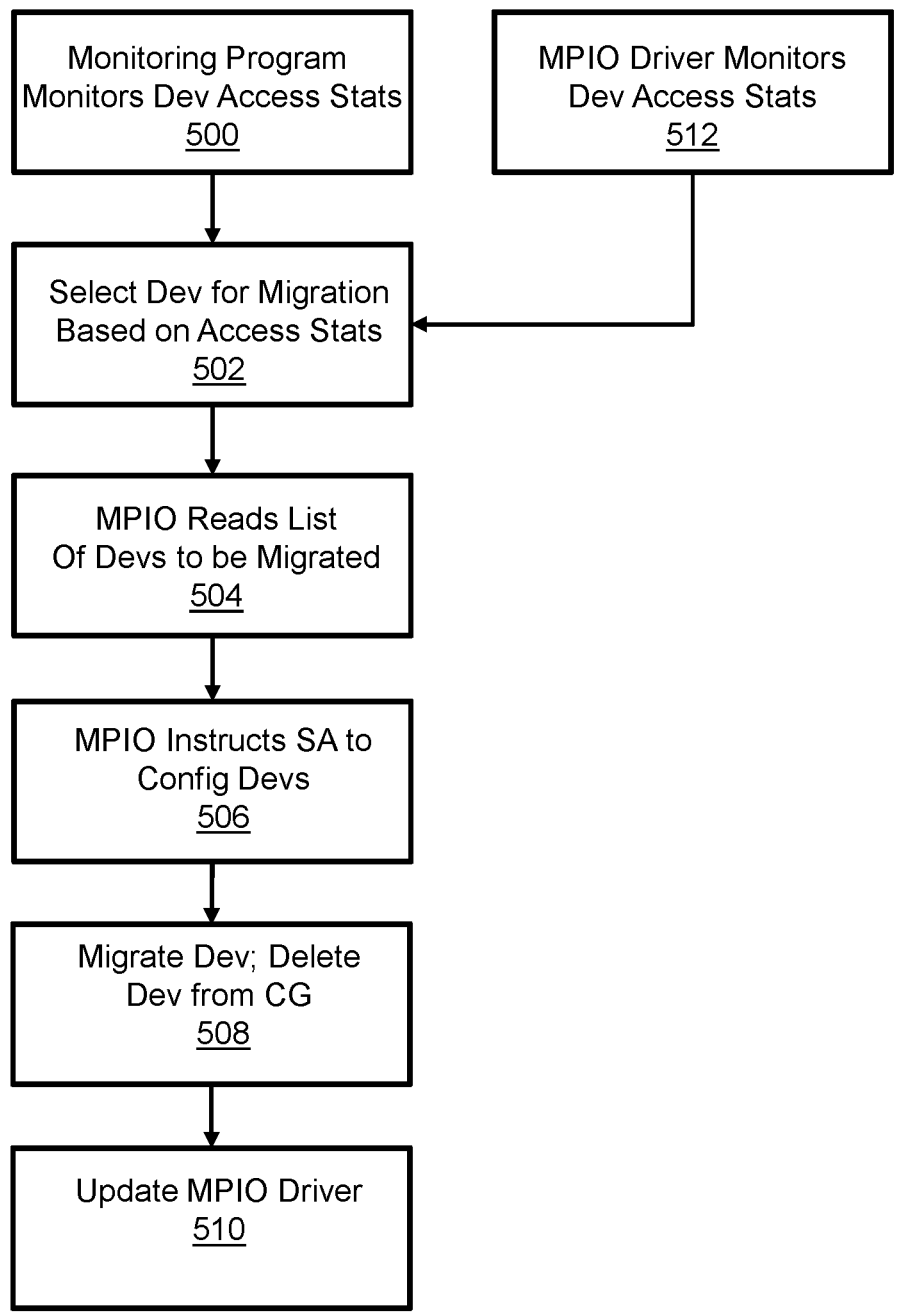
FIG. 5 illustrates a technique for migrating a device from a cloud gateway to a storage array.

Device and data migration from the cloud gateway 104 to the storage array 102 will now be described with reference to FIGS. 1 and 5. Monitoring program 120 monitors device usage on the cloud gateway as indicated at block 500. More particularly, the monitoring program monitors accesses by the host to data associated with all logical volumes presented by the cloud gateway, including logical volume 108", and data access information is used to generate device access statistics that indicate relative levels of access activity between devices and quantified access activity relative to a predetermined threshold value. The monitoring program may select one or more devices for migration as indicated in block 502. For example, if the threshold value is a period of time and level of activity and a predetermined number of IOs to the logical volume 108" have been received during that time period, or a predetermined number of extents of data associated with logical volume 108" have been accessed during that time period, then volume 108" may be selected for migration. With regard to relative levels of activity, if the storage array has available storage capacity then the most active device may be selected for migration. The IDs of the devices selected for migration are stored in a record. The MPIO driver 116 reads the record of devices selected for migration as indicated in block 504. The MPIO driver then instructs the storage array to configure corresponding devices on the storage array as indicated in block 506. For example, a storage array device (logical volume 108') corresponding to the cloud gateway device to be migrated (logical volume 108") is created. The device created on the storage array may have the same size and addresses, but the unique device ID X on the storage array differs from the unique device ID Y of the corresponding device on the cloud gateway, e.g. and without limitation the WWNs or WWIDs. The LUN (i.e. the number) may also differ between the device on the cloud gateway and the device configured on the storage array. However, the MPIO driver 116 consistently presents the same unique device ID Z to OS 112, i.e. before and after migration. The instruction sent by the MPIO driver to prompt creation of the device may include a SCSI VU command. The device is then migrated as indicated in block 508. More particularly, the data is moved from the cloud gateway to the storage array and the device is deleted from the cloud gateway. The MPIO driver 116 updates its record of paths to the device as indicated by block 510 by removing references to paths to the cloud gateway and creating references to paths to the device on the storage array. When IOs to the device are sent to the MPIO driver by the host applications and OS after migration the IOs are directed to the storage array rather than the cloud gateway.

As indicated by block 512 the MPIO driver may be used to monitor device access statistics and select devices for migration based on the statistics. In other words, monitoring of device access statistics by the MPIO driver may be implemented in conjunction with or as an alternative to monitoring of device access statistics by the monitoring program.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:
1. An apparatus comprising:
a host computer comprising a processor, computer-readable memory and at least one host application;
a storage array comprising a plurality of computing nodes and persistent storage, each computing node comprising a processor and computer-readable memory, and managing a portion of the persistent storage;
a cloud gateway comprising a processor, computer-readable memory, and a translation program that translates between a first protocol implemented by the host computer and a second protocol implemented by cloud storage; and program code stored on non-transitory computer-readable media that migrates data associated with a logical volume presented to the at least one host application with a first unique device ID between the storage array and the cloud gateway by causing creation of a new logical volume with a second unique device ID that is different than the first unique device ID, causing the data to be written to the new logical volume, and presenting the new logical volume to the at least one host application with the first unique device ID after moving the data, whereby the migration is transparent to the at least one host application.

2. The apparatus of claim 1 wherein the logical volume is presented by the storage array and wherein the program code comprises a multi-path input-output driver on the host computer that instructs the cloud gateway to create the new logical volume.

3. The apparatus of claim 2 comprising the program code moving the data to the new logical volume on the cloud gateway.

4. The apparatus of claim 3 comprising the program code deleting the logical volume from the storage array after moving the data to the new logical volume on the cloud gateway.

5. The apparatus of claim 4 comprising a multi-path input-output driver on the host computer and comprising the program code updating paths between the host computer and the logical volume.

6. The apparatus of claim 1 wherein the program code comprises a multi-path input-output driver on the host computer that monitors accesses to the logical volume and prompts the migration based on the monitored accesses.

7. The apparatus of claim 1 wherein the logical volume is presented by the storage array and wherein the program code comprises a tiering program on the storage array that monitors accesses to the logical volume and prompts the migration to the cloud gateway based on the monitored accesses.

8. The apparatus of claim 1 wherein the logical volume is presented by the cloud gateway and wherein the program code comprises a monitoring program on the cloud gateway that monitors accesses to the logical volume and prompts the migration to the storage array based on the monitored accesses.

9. The apparatus of claim 1 comprising the program code initiating the migration from the storage array to the cloud gateway based on an absence of accesses to the logical volume.

10. The apparatus of claim 1 comprising the program code initiating the migration from the cloud gateway to the storage array based on resumption of accesses to the logical volume.

11. A method comprising:
in a storage system comprising: a host computer comprising a processor, computer-readable memory and at least one host application; a storage array comprising a plurality of computing nodes and persistent storage, each computing node comprising a processor and computer-readable memory, and managing a portion of the persistent storage; and a cloud gateway comprising a processor, computer-readable memory, and a translation program that translates between a first protocol implemented by the host computer and a second protocol implemented by cloud storage:

migrating data associated with a logical volume presented to the at least one host application with a first unique device ID between the storage array and the cloud gateway by causing creation of a new logical volume with a second unique device ID that is different than the first unique device ID and causing the data to be written to the new logical volume; and presenting the new logical volume to the at least one host application with the first unique device ID after moving the data, whereby the migration is transparent to the at least one host application.

12. The method of claim 11 wherein the logical volume is presented by the storage array and comprising a multi-path input-output driver on the host computer instructing the cloud gateway to create the new logical volume.

13. The method of claim 12 comprising moving the associated data to the new logical volume on the cloud gateway.

14. The method of claim 13 comprising deleting the logical volume from the storage array after moving the data to the new logical volume on the cloud gateway.

15. The method of claim 14 comprising updating paths between the host computer and the logical volume.

16. The method of claim 11 comprising a multi-path input-output driver on the host computer monitoring accesses to the logical volume and prompting the migration based on the monitored accesses.

17. The method of claim 11 wherein the logical volume is presented by the storage array and comprising a tiering program on the storage array monitoring accesses to the logical volume and prompting the migration to the cloud gateway based on the monitored accesses.

18. The method of claim 11 wherein the logical volume is presented by the cloud gateway and comprising a monitoring program on the cloud gateway monitoring accesses to the logical volume that are used to prompt the migration to the storage array.

19. The method of claim 11 comprising initiating the migration from the storage array to the cloud gateway based on an absence of accesses to the logical volume.

20. The method of claim 11 comprising initiating the migration from the cloud gateway to the storage array based on resumption of accesses to the logical volume.

* * * * *